United States Patent [19]

Kolze

[11] 4,283,040

[45] * Aug. 11, 1981

[54] PRESSURE OPERATED PILOT CONTROL SHUT-OFF VALVE

[75] Inventor: Lawrence A. Kolze, Bensenville, Ill.

[73] Assignee: Eaton Corporation, Cleveland, Ohio

[*] Notice: The portion of the term of this patent subsequent to Nov. 20, 1996, has been disclaimed.

[21] Appl. No.: 82,204

[22] Filed: Oct. 5, 1979

Related U.S. Application Data

[63] Continuation of Ser. No. 796,779, May 13, 1977, Pat. No. 4,174,824.

[51] Int. Cl.$^3$ ............................................. F16K 31/40
[52] U.S. Cl. ..................................... 251/30; 251/38; 251/45
[58] Field of Search ..................... 251/30, 38, 45, 129, 251/141

[56] References Cited

U.S. PATENT DOCUMENTS

| | | | |
|---|---|---|---|
| 2,496,553 | 2/1950 | Littlefield | 251/38 |
| 2,504,428 | 4/1950 | Kimball | 251/129 |
| 2,654,393 | 10/1953 | Ghormley | 251/38 |
| 2,940,722 | 6/1960 | Vargo | 251/30 |
| 2,965,350 | 12/1960 | Knaebel et al. | 251/30 |
| 3,114,532 | 12/1963 | Gray et al. | 251/30 |
| 3,405,906 | 10/1968 | Keller | 251/30 |
| 3,593,956 | 7/1971 | McCarty, Jr. | 251/30 |
| 3,872,878 | 3/1975 | Kozel et al. | 251/30 |
| 3,917,218 | 11/1975 | Marocco | 251/30 |
| 4,174,824 | 11/1979 | Kolze | 251/30 |

Primary Examiner—Martin P. Schwadron
Assistant Examiner—G. L. Walton
Attorney, Agent, or Firm—R. J. McCloskey; R. A. Johnston

[57] ABSTRACT

A fluid pressure operated pilot control diaphragm valve having the pilot opened in response to energization of an electromagnetic actuator. The actuator includes a movable armature means operable to open the pilot and stop means movable with the armature for limiting the amount of opening of the pilot. The stop means includes means operative to prevent closing of the pilot when the armature means is subsequently moved by fluid pressure opening of the diaphragm valve.

8 Claims, 4 Drawing Figures

U.S. Patent  Aug. 11, 1981  Sheet 1 of 2  4,283,040
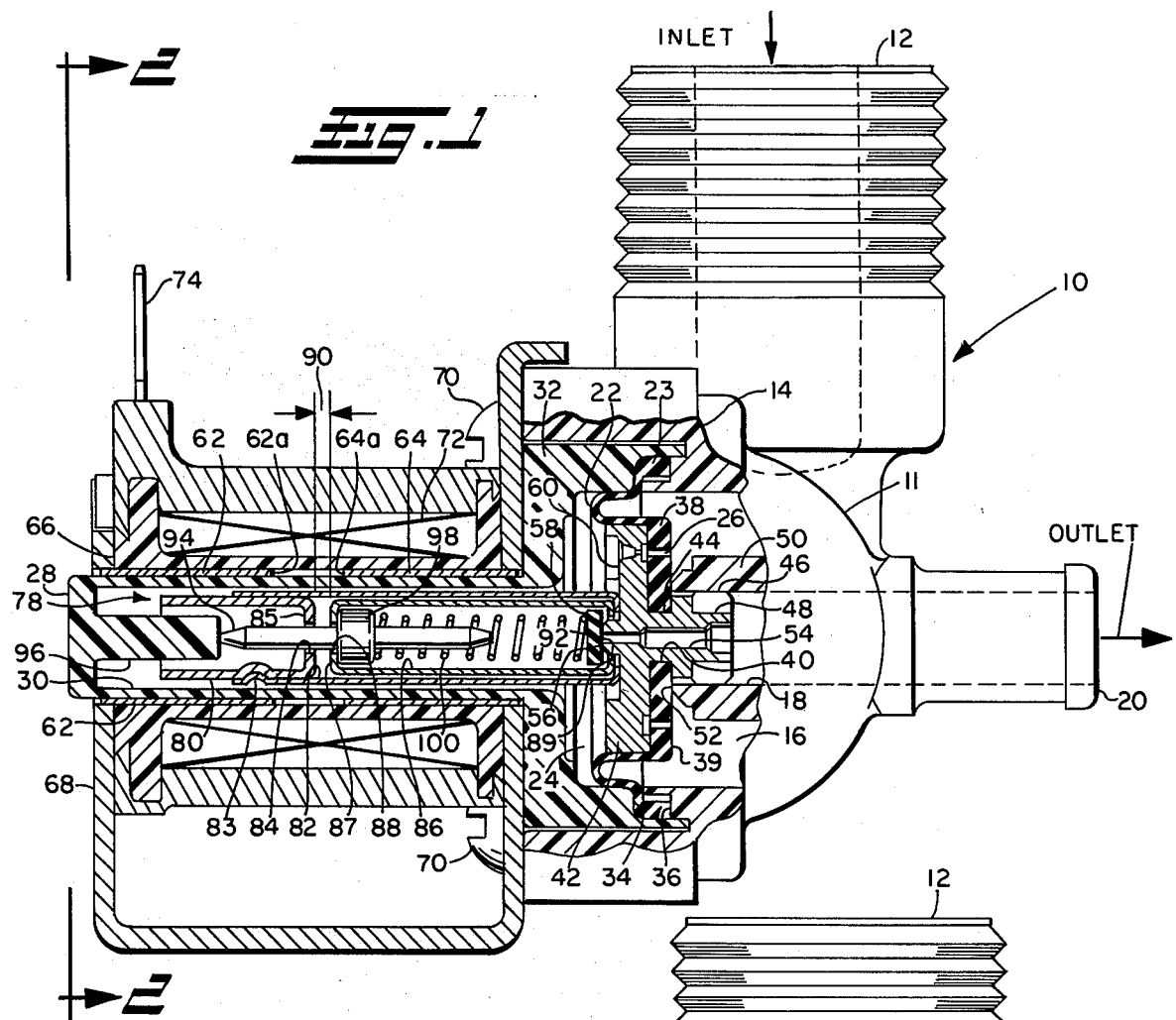
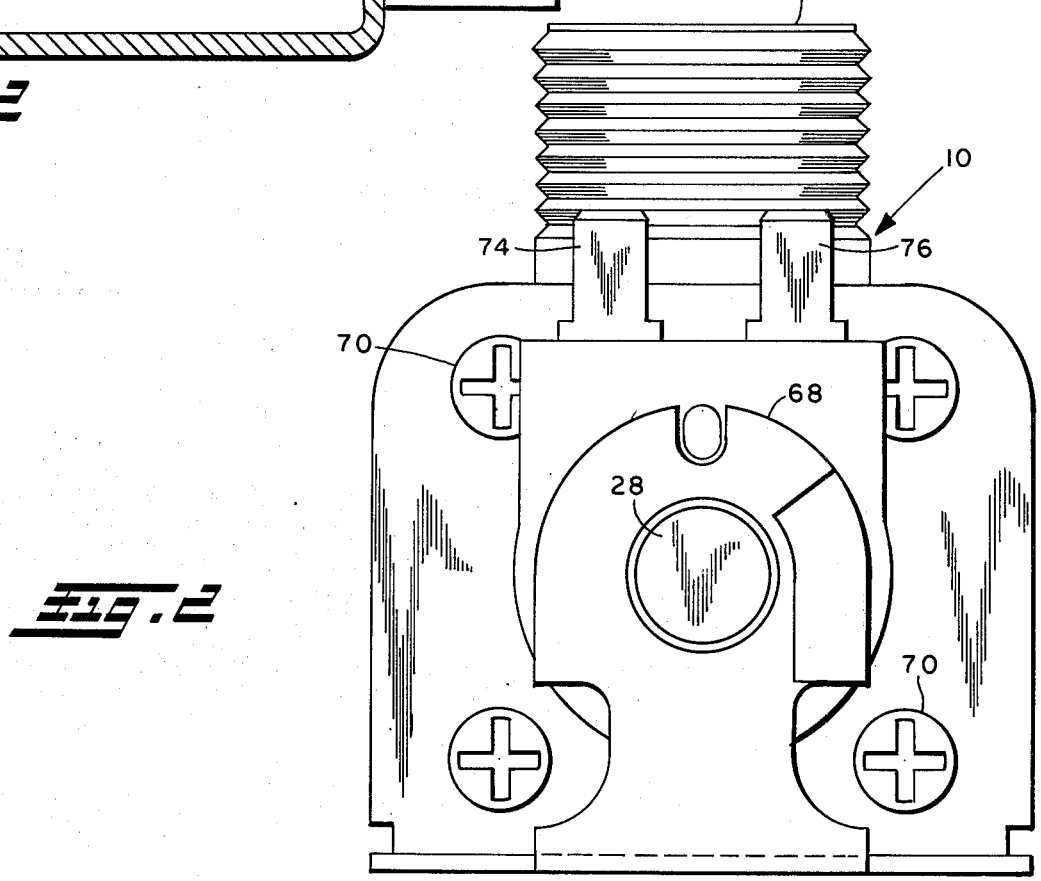

PRESSURE OPERATED PILOT CONTROL SHUT-OFF VALVE

CROSS REFERENCE TO RELATED APPLICATION

This application is a Continuation of my copending application Ser. No. 796,779 filed May 13, 1977 now U.S. Pat. No. 4,174,824.

BACKGROUND OF THE INVENTION

The present invention relates to pressure operated shut-off valves of the type controlled by opening of a pilot valve having a flow passage substantially smaller than the main valve for initiating flow without hammering in the flow passages. Valves of this type are known in the art as, for example, those described in U.S. Pat. Nos. 3,593,956 to W. R. McCarty, Jr., 3,593,957 to P. A. Dolter et al, and 3,672,627 to W. R. McCarty, Jr., et al. In the construction of a known pilot control shut-off valve, a main valve member is seated on a valve seat intermediate the valve inlet and outlet. The main valve member is attached to a pressure-responsive diaphragm which divides the inlet side of the valve into two chambers which are interconnected by a bleed passage to a diaphragm. When the main valve is closed, the pressure from the inlet is equalized in the two chambers. A pilot passage is provided through the main valve member and is sealed by a pilot valve normally closed. An electromagnetic actuator, upon energization, opens the pilot valve to permit flow from one of the fluid chambers through the pilot passage to the outlet of the valve. The discharge from the downstream one of the chambers and through the pilot passage to the valve outlet creates a pressure differential across the diaphragm which subsequently opens the main valve member. As the main valve member moves in response to the pressure forces, the main valve member encounters the pilot valve member if the pilot valve has not been moved a sufficient distance from the pilot seat on the main valve against which the pilot is seated in its closed position.

In providing an electromagnetic actuator for moving the pilot valve, previous valve designs have employed an armature chamber fluidically connected to one of the chambers formed by the diaphragm, with the pilot valve contained therein. An armature is disposed within the pilot valve chamber and connected to the pilot valve such that movement of the armature opens the pilot valve. Pole pieces are disposed about the sealed chamber such that the air gap between the end of the pole piece and the armature defines the null or maximum force position of the armature in its movement. A coil is disposed about the pole piece and, upon energization of the coil, the armature moves to the null position and opens the pilot valve by an amount of the armature stroke. In this type of actuator arrangement the armature is required to have a substantial movement in order to position the pilot valve in the open position such that movement of the main valve by pressure forces on the diaphragm will not cause the pilot valve to close, resulting in shutting of the main valve.

When the air gap is made sufficiently large in order to provide the required armature stroke for moving the pilot valve the desired distance from its seat, a large magnetomotive force is required from the current flow in the coil in order to cause movement of the armature. The requirement for the relatively long armature stroke and high magnetomotive force has resulted in the need for a substantial number of turns in the coil for a given electrical source or greater electrical power for a given number of coil turns, and thus has resulted in limiting attempts to reduce the size and power requirements of the actuator coil.

SUMMARY OF THE INVENTION

The present invention provides a solution to the above described problem of designing a pressure-operated pilot control shut-off valve having a minimum size and power requirement for the electromagnetic actuator for initiating opening of the pilot for a pressure operated valve.

The present invention provides a pressure operated diaphragm main valve having a bleed hole for equalizing pressure across the diaphragm when the valve is in the closed position. The valve has a pilot passage therethrough with a movable pilot valve seated thereagainst and normally biased to the closed position for preventing flow through the pilot passage. A sealed housing encloses the pilot valve and a guide means within the housing. An armature is movably received in the guide means and operably connected for movement of the pilot valve. A ferromagnetic pole piece is disposed about the housing and defines the air gap between the pole thereof and the armature. An electrical coil is disposed about the pole piece and, upon energization of the coil, the armature is caused to move a specified distance until making contact with a stop means. The stop means includes a means for limiting the opening of the pilot valve with respect to its seat on the diaphragm valve. Upon subsequent opening of the main valve, movement of the main valve engages the stop means and causes continued movement of the armature and pilot valve. The stop means includes means for preventing closing of the pilot valve when the armature means is moved by the movement of the main valve.

The present invention thus requires a substantially reduced magnetomotive force for moving of the armature means, since the armature is not required to move a distance equal to the over-all travel of the main diaphragm valve, but rather the armature means moves only a predetermined distance to a stop means which is subsequently movable with the main valve, and which stop means maintains the pilot valve in a predetermined open position during subsequent movement of the main diaphragm valve.

The present invention thus provides a unique structure for a pilot control pressure operated shut-off valve which requires only a small electrical coil for actuating the pilot valve. The valve of the present invention permits the pilot valve actuator to be arranged with a substantially reduced air gap in the electromagnetic actuator means, and thus insures a greater actuating force upon the pilot valve for a given number of coil turns and electrical power input. The reduced air gap and increased pilot actuating force reduces the occurrence of loss of pilot opening force and inadvertent closing of the pilot and subsequent shut-off of the main valve due to variations in the magnetomotive force applied to open the pilot valve.

BRIEF DESCRIPTION OF THE DRAWINGS

FIG. 1 is an elevation view of the valve assembly, portions thereof broken away and in partial section;

FIG. 2 is an end view of the embodiment of FIG. 1 taken along view indicating lines 2—2 of FIG. 1;

DETAILED DESCRIPTION

Figure 3:
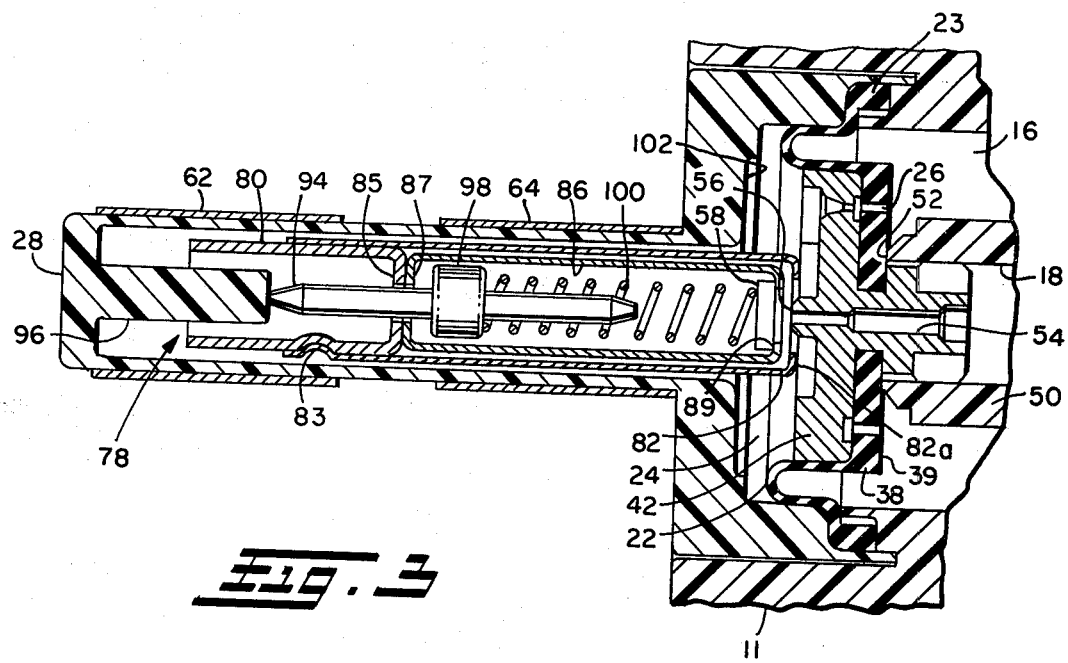
FIG. 3 is a partial view similar to FIG. 1 and shows the position of the armature means and stop means upon initial opening of the pilot valve; and, FIG. 4 is a view similar to FIG. 1 and shows the armature and poppet positions when the main valve is fully open.

Referring now to FIG. 1, the valve assembly indicated generally at 10 has a main body or housing 11 having an inlet nipple 12 with an inlet bore 14 provided therein which communicates with a pilot chamber 16 formed in the body 11. The body 11 has an outlet nipple 20 provided thereon with an outlet passage 18 communicating therewith for discharging fluid when the valve assembly 10 is energized. The pilot chamber 16 is separated from a bleed chamber 24 by a flexible diaphragm 22 preferably formed of elastomeric material. A bleed orifice 26 is provided through the diaphragm to permit pressure equalization between the pilot chamber 16 and the bleed chamber 24, the passage 26 being of sufficiently reduced size to create a substantial pressure drop between the pilot chamber 16 and the bleed chamber 24 when the valve is in the open position for discharge through outlet passage 18. The bleed chamber is formed partially by a guide member 28 having an elongated portion with a cylindrical bore 30 provided therein, which bore communicates with the bleed chamber 24.

The guide member 28 has an enlarged portion 32 at the rightward end thereof in FIG. 1, which portion 32 has an annular recess 34 provided therein which is received over the outer bead 23 of the diaphragm 22 and the recess 34 seals the bead 23 of the diaphragm against a corresponding annular bead recess 36 provided in the body 11. The enlarged portion 32 of the guide member is retained in the body 11 to engage the bead 23 of the diaphragm fluid pressure sealing arrangement to prevent passage of fluid outwardly therearound from the pilot chamber to the bleed chamber. The central region of the diaphragm has a thickened portion 38 in which the bleed passage 26 is formed with a central aperture 40 provided therein. A poppet member 42 is provided and has an annular groove 44 with the bottom thereof sized such that, when the aperture 40 of the diaphragm is received thereover, the aperture is in a stretched condition to provide pressure sealing engagement of the poppet member with the diaphragm aperture 40. The poppet member thus serves to stiffen the central portion 38 of the diaphragm to provide a valve seating surface on the rightward face 39 thereof in FIG. 1. The poppet has a pilot 46 provided thereon which is sized so as to be received in a slip fitting manner in the outlet bore 18. If desired the poppet pilot may have a plurality of radial recesses 48 provided therein to permit passage of fluid therethrough and prevent sticking of the pilot in bore 18.

The outlet bore 18 in the body is formed in a boss 50 extending into the outer chamber 16 and the boss 50 terminates in a valve seat 52 against which the diaphragm face 39 is biased to provide closure of the pilot passage from the outlet bore 18. The poppet has a central pilot passage 54 provided therethrough, the poppet being formed of rigid material with the leftward face of the poppet in FIG. 1 having the pilot passage extending therethrough. The pilot valve seat 56 is formed at the exit of the pilot passage 54 and the leftward face of the poppet member, with the annular region radially outward of the valve seat being relieved in the leftward face of the poppet member in the form of a groove 60 such that the valve seat 56 extends leftwardly to form a pilot valve seat boss. The pilot valve member 58 is preferably formed of resilient material as, for example, elastomeric or plasticized plastic substances.

In the present preferred practice of the invention the body 11 and the guide member 28 are formed of substantially rigid material such as, for example, non-magnetic metallic or unplasticized plastic material.

The guide member 28 has received thereover a pair of tubular pole pieces 62 and 64 of ferromagnetic material and in axially spaced arrangement so as to define an air gap between the ends 64a and 62a thereof. A cylindrical coil bobbin 66 of suitable non-magnetic material is received over the pole pieces 62 and 64 in closely fitting relationship and is retained thereon by a suitable bracket 68 secured to the body 11 by suitable fasteners 70. The bobbin has a coil 72 containing the desired number of turns of electrical conductor thereon which conductor terminates in insulated terminals 74 and 76 (see FIG. 2), which are adapted for connection to an external force of electrical power.

The guide member 28 has received in the bore 30 thereof an armature assembly 78 movable longitudinally within the bore 30 in either a leftward or rightward direction with reference to FIG. 1. The armature assembly comprises an upper tubular member 80 formed of ferromagnetic material received in a cage member 82 of tubular configuration and formed of nonmagnetic material, such as aluminum or plastic, and retained thereon by any suitable means as, for example, staking or dimpling 83. The rightward end 85 of upper armature portion 80 is cupped inwardly and has an aperture 84 formed centrally therein. A second or lower armature portion 86 is slidably received in a tubular cage member 82 with the leftward end 87 thereof cupped inwardly with an aperture 88 provided therein with the cupped end thereof spaced a predetermined distance 90 from the adjacent rightward end 85 of the upper armature. The rightward end 89 of the lower armature 86 is also cupped radially inwardly and has an aperture 92 of diameter less than the outer periphery of the pilot valve 58. The rightward end 89 of cage member 82 is also cupped radially inwardly and has an aperture formed therein to clear the boss 56 for the pilot valve seat but less than the outer diameter of the lower armature portion 86. The lower armature portion 86 is thus encased in the cage member 82 but is free to move longitudinally therein the distance 90. The lower armature portion in its rightmost extreme position has the rightward end 89 thereof in contact with the rightward cupped end of the cage 82. In the leftwardmost position (see FIG. 3), the lower armature portion 86 has the leftward cupped end 87 thereof in contact with the corresponding adjacent rightward cupped end 85 of the upper armature portion 80.

An elongated guide pin 94 is received in the lower armature portion, the leftward end of the guide pin extending through apertures 88 and 84 in the cupped ends of the upper and lower armature portions, with the end of the guide pin contacting a raised boss 96 provided on the leftward end of the outer guide member 28. The guide pin 94 has an annular collar portion 98 provided thereon with the left face of the collar 98 in contact with the inner face of the leftward cupped portion 87 of the lower armature. The rightward end of the guide pin 94 has received thereover a bias spring 100 which has one end contacting the rightward face of collar 98 and the opposite end thereof in contact with the face of pilot valve 58 with the spring in a compressed state so as to urge the end of guide pin 94 against the end of boss 96 and, in reaction thereto, seat the pilot valve 58 against its seat 56. The reaction force of the pilot valve member 58 against seat 56 urges the poppet member 42 rightwardly so as to cause the diaphragm to seat against the seating surface 52 as shown in FIG. 1, thus maintaining the pilot valve 58 and the main valve 52 in the closed position. The rightward cupped end of the cage 82 and the cupped end 89 of lower armature portion 86 have a combined thickness less than the axial extent of the pilot seat boss 56 so that the lower armature portion and cage 82 float freely longitudinally when the pilot valve 58 is biased against its seat 56.

Referring now to FIG. 3, the armature assembly is shown in the operative position assumed upon initial energization of the coil. In FIG. 3, the magnetomotive force produced by flow of current in the coil (omitted in FIG. 3 for clarity), has caused the lower armature portion 86 to move leftward until the cupped end 87 thereof contacts the adjacent cupped end 85 of the upper armature portion 80. The motion of the lower armature portion 86 causes the rightward cupped end 89 thereof to lift the pilot valve 58 from its seat 56 by an amount equal to the distance 90 (see FIG. 2) thereby overcoming the bias of spring 100. The guide pin 94 is maintained in its position by the stop 96 and the collar 98 has its leftward face spaced from the cupped end 87 of the lower armature portion 86 by an amount equal to the distance 90 shown in FIG. 2. The spring 100, being further compressed, maintains the pilot valve member 58 biased against the inner or leftward face of the rightward cupped end 89 of lower armature portion 86.

With the pilot valve 58 in the position shown in FIG. 3, the fluid in bleed chamber 24 is discharged through pilot passage 54 and outwardly through the outlet passage 18. The flow of fluid through pilot passage 54 causes a drop in pressure in chamber 24 resulting in flow through bleed passage 26 which provides a restriction as compared to the flow through pilot passage 54. Restriction of flow through bleed passage 26 with the pilot valve open results in lower fluid pressure in chamber 24 than that in chamber 16, resulting in a pressure differential across the diaphragm 22.

The pressure differential between chambers 24 and 16 acting across diaphragm 22 causes the diaphragm to lift its center portion 38 and face 39 from main valve seat 52 and move the diaphragm and poppet 42 leftward, permitting flow from chamber 16 across the main valve seat 52 and directly into the outlet 18.

Figure 4:
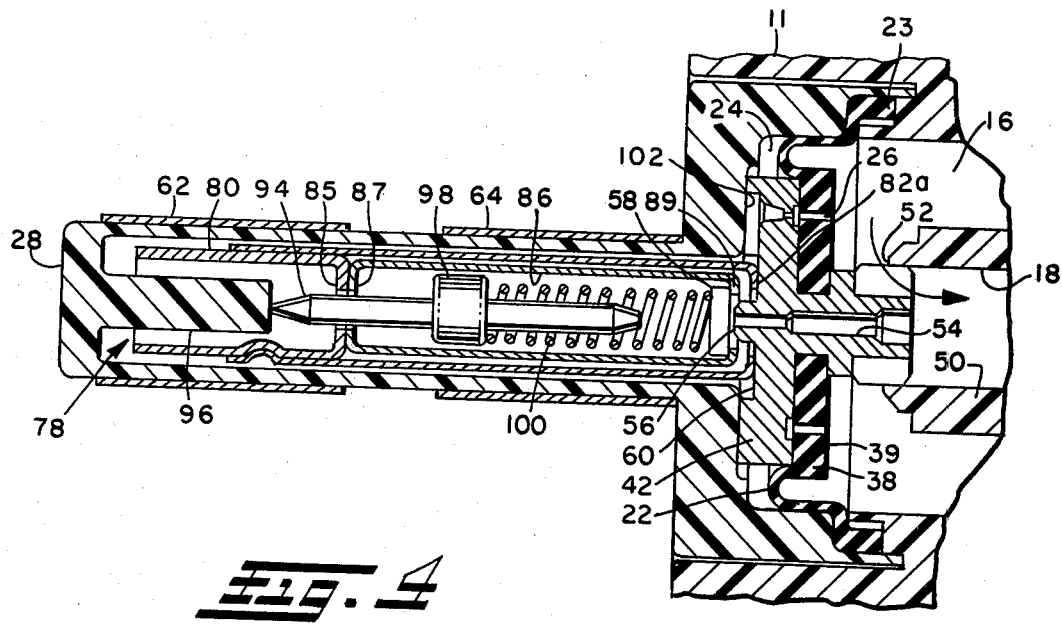

Referring now to FIG. 4, the poppet and diaphragm central portion 38 are shown in the full open position with the poppet in its extreme leftmost position. The left face of the poppet 42 is thus bottomed against the inner surface 102 of the guide member 28 such that the diaphragm seating surface 39 is lifted to the fullest extent from main valve seat 52 permitting fluid to flow from chamber 16 over the valve seat 52, through the recesses formed in the pilot portion of the poppet and through outlet passage 18.

As the poppet 42 moves leftward from its closed position illustrated in FIG. 1 to the position shown in FIG. 4, the bottom of the poppet groove 60 engages the rightward end 82a of the tubular cage 82 and moves the armature assembly 78 leftward with continued movement of the poppet 42. When the leftward face of poppet 42 comes to rest against the surface 102 of the guide member, the pilot valve member 58 is biased, with an increased force by the additional compression of spring 100, against the inner surface of the end 89 of lower armature section 86.

In the fully open position, the armature assembly 78 remains in the position shown in FIG. 4 with the pilot valve 58 displaced from its seat 56 by action of the magnetomotive force from the coil. While the coil is energized, magnetomotive force holds the end 87 of the lower armature in contact with the end 85 of the upper armature to maintain the pilot valve spaced from its seat 56. Upon the de-energization of the coil, the force of spring 100 urges the pilot valve 58 and lower armature section 86 rightward in FIG. 4 until the pilot valve 58 contacts seat 56 and prevents flow through the pilot passage 54. Cessation of fluid flow through passage 54 produces equalization of the pressure in chamber 16 and chamber 24 through bleed orifice 26 and the pressure forces tending to urge the poppet 42 in a leftward direction are neutralized. Subsequently, under the biasing force of spring 100, the poppet and diaphragm seating surface 39 are urged rightward to seat against valve seat 52, thus shutting off flow from chamber 16 through outlet passage 16.

It will be apparent from the foregoing description that the pilot-controlled pressure-operated electromagnetically energized shut-off valve of the present invention provides a unique and novel structure. The pilot valve of the present invention is actuated by electromagnetic means having a two-section armature assembly with one section caged and movable relative to the other and the assembly is disposed in a sealed chamber in communication with the pilot valve. The cage is attached to the remaining armature section such that, upon energization of the electromagnetic means, the caged section moves within the cage by a predetermined air gap to contact the remaining armature section, movement of the caged armature section being operable to open the pilot valve. Upon subsequent movement of the main valve member by unbalanced pressure forces applied thereacross, the main valve member contacts a stop provided on the cage and thereafter moves the entire armature assembly therewith. The movement of the armature assembly by the main valve poppet is prevented from closing the pilot valve against its seat by the relationship of the caged armature section with the stop provided on the cage for contacting the main poppet valve. The arrangement of the present invention thus permits the armature to be constructed with a relatively small air gap and operated by a minimum magnetomotive force for lifting the pilot valve from its seat. The armature is capable of absorbing substantially large movement when contacted by the main valve member without disturbing the position of the pilot valve with respect to its seat. This construction permits relatively large displacement of the main poppet valve to be accomplished by heretofore unobtainably small magnetomotive force requirement from the electromagnetic actuator for opening the pilot valve.

Modifications and variations of the present invention will be apparent to those having ordinary skill in the art having read the foregoing and the invention described hereinabove is limited only by the following claims.

I claim:

1. A valve assembly of the type operable to permit and interrupt fluid flow through the main passage thereof, said assembly comprising:
   (a) housing means defining a fluid passage having an inlet and an outlet and including means defining a main valve seating surface intermediate said inlet and outlet, said housing means including guide means defining a guide hollow having the walls thereof formed of nonmagnetic material;
   (b) a main valve member movable with respect to the housing means between a closed position contacting said seating surface and an open position spaced from said seating surface permitting fluid flow from said inlet to said outlet;
   (c) means biasing said main valve member to the closed position;
   (d) means defining a bleed passage across said valve member and means defining a pilot flow passage for communicating said inlet and said outlet;
   (e) a pilot valve member movable between a closed position preventing fluid flow through said pilot flow passage and an open position permitting flow through said pilot flow passage;
   (f) means biasing said pilot valve to the closed position;
   (g) magnetomotive force means operable upon actuation to effect said operation of said valve assembly to move said pilot valve member from said closed to said open position, and including,
      (i) floating pole piece means formed of ferromagnetic material and movably received in said guide hollow,
      (ii) armature means formed of ferromagnetic material received in said guide hollow and movable with respect to said pole piece means between a first position spaced a predetermined distance from said pole piece means in which first position said pilot valve is closed and a second position less than said predetermined distance from said pole piece means in which said second position said pilot valve is open,
      (iii) stop means cooperating with said pole piece and said armature means and movable therewith, said stop means being operable to limit the movement of said main valve member relative to said pole piece means whereupon actuation of said magnetomotive force means, said armature means is moved from said first position to said second position permitting flow through said pilot passage thereby causing a pressure differential across said valve member, whereupon said main valve is opened by the forces of differential pressure acting thereacross, wherein as said main valve moves from said closed to said open position, said main valve contacts, said stop means and thereafter said pole piece means and said armature means move as a unit therewith.

2. The valve assembly defined in claim 1, wherein said pole piece means includes a member having a generally tubular configuration with one end thereof cupped.

3. The valve assembly defined in claim 1, wherein said armature means comprises a member having a generally tubular configuration with the ends thereof cupped.

4. The valve assembly defined in claim 1, wherein said armature comprises a generally tubular member with the ends thereof cupped and said pilot valve comprises a resilient member disposed within said armature and movable with respect thereto.

5. A pilot operated valve assembly of the type operable to permit and interrupt fluid flow through the main passage thereof, said assembly comprising:
   (a) housing means defining a fluid passage having an inlet and an outlet and including means defining a main valve seating surface intermediate said inlet and outlet, said housing means including guide means defining a guide hollow having the walls thereof formed of nonmagnetic material;
   (b) a main valve member movable with respect to the housing means between a closed position contacting said seating surface in which closed position, fluid flow is blocked from said inlet to said outlet and an open position spaced from said seating surface permitting fluid flow from said inlet to said outlet;
   (c) means biasing said main valve to the closed position;
   (d) means defining a bleed passage across said valve member and means defining a pilot flow passage for communicating said inlet and said outlet;
   (e) a pilot valve member movable between a closed position preventing fluid flow through said pilot flow passage and an open position permitting flow through said pilot passage;
   (f) means biasing said pilot valve to the closed position;
   (g) magnetomotive force means operable upon actuation to effect said operation of said valve assembly to move said pilot valve member from said closed to said open position and including,
      (i) floating pole piece means formed of ferromagnetic material and movably received in said guide hollow;
      (ii) armature means formed of ferromagnetic material having a tubular configuration and received in said guide hollow and movable with respect to said pole piece means between a first position spaced from said pole piece means in which first position said pilot valve is closed and a second position contacting said pole piece means in which said second position said pilot passage is open, said armature means having said pilot valve captured therein;
      (iii) stop means cooperating with said floating pole piece means and said armature means and movable therewith, said stop means being operable to limit the movement of said main valve member relative to said pole piece means, whereupon actuation of said magnetomotive force means, said armature means is moved from said first position to said second position permitting flow through said pilot passage thereby causing a pressure differential across said valve member, whereupon said main valve passage is opened by the forces of differential pressure acting thereacross, wherein as said main valve moves from said closed to said open position said main valve contacts said stop means and thereafter said pole piece means and said armature means move as a unit therewith.

6. The valve assembly defined in claim 5, wherein said pilot valve member is formed of resilient elastomeric material.

7. A valve assembly of the type operable to permit and interrupt fluid flow through the main passage thereof, said assembly comprising:
  (a) housing means defining a fluid passage having an inlet and an outlet and including means defining a main valve seating surface intermediate said inlet and outlet, said housing means including guide means defining a guide hollow having the walls thereof formed of nonmagnetic material;
  (b) a main valve member movable with respect to the housing means between a closed position contacting said seating surface and an open position spaced from said seating surface permitting fluid flow from said inlet to said outlet;
  (c) means biasing said main valve member to the closed position;
  (d) means defining a bleed passage across said valve member and means defining a pilot flow passage for communicating said inlet and said outlet;
  (e) a pilot valve member movable between a closed position preventing fluid flow through said pilot flow passage and an open position permitting flow through said pilot flow passage;
  (f) means biasing said pilot valve to the closed position;
  (g) magnetomotive force means operable upon actuation to effect said operation of said valve assembly to move said pilot valve member from said closed to said open position, and including,
    (i) floating pole piece means formed of ferromagnetic material and movably received in said guide hollow, said pole piece means comprising a tubular member with one end cupped;
    (ii) armature means comprising a tubular member having the ends thereof cupped formed of ferromagnetic material and received in said guide hollow and movable with respect to said pole piece means between a first position spaced a predetermined distance from said pole piece means in which first position said pilot valve is closed and a second position less than said predetermined distance from said pole piece means in which said second position said pilot valve is open;
    (iii) stop means cooperating with said pole piece means and movable therewith, said stop means comprising a tubular member formed of nonmagnetic material having one end thereof secured over said pole piece means and the other end cupped, and said stop means operable to limit the movement of said main valve member relative to said pole piece means whereupon actuation of said magnetomotive force means said armature means is moved from said first position to said second position permitting flow through said pilot passage thereby causing a pressure differential across said valve member, whereupon said main valve is opened by the forces of differential pressure acting thereacross, wherein as said main valve moves from said closed to said open position, said stop means, said pole piece means and said armature means move as a unit therewith.

8. A pilot operated valve assembly of the type operable to permit and interrupt fluid flow through the main passage thereof, said assembly comprising:
  (a) housing means defining a fluid passage having an inlet and an outlet and including means defining a main valve seating surface intermediate said inlet and outlet, said housing means including guide means defining a guide hollow having the walls thereof formed of nonmagnetic material;
  (b) a main valve member movable with respect to the housing means between a closed position contacting said seating surface in which closed position, fluid flow is blocked from said inlet to said outlet and an open position spaced from said seating surface permitting fluid flow from said inlet to said outlet;
  (c) means biasing said main valve to the closed position;
  (d) means defining a bleed passage across said valve member and means defining a pilot flow passage for communicating said inlet and said outlet;
  (e) a pilot valve member movable between a closed position preventing fluid flow through said pilot flow passage and an open position permitting flow through said pilot passage;
  (f) means biasing said pilot valve to the closed position
  (g) magnetomotive force means operable upon actuation to effect said operation of said valve assembly to move said pilot valve member from said closed to said open position and including:
    (i) floating pole piece means having a tubular configuration and formed of ferromagnetic material and movably received in said guide hollow,
    (ii) armature means formed of ferromagnetic material having a tubular configuration and received in said guide hollow and movable with respect to said pole piece means between a first position spaced from said pole piece means in which first position said pilot valve is closed and a second position contacting said pole piece means in which said second position said pilot passage is open, said armature means having said pilot valve captured therein,
    (iii) stop means cooperating with said floating pole piece means and movable therewith, comprising a tubular member formed of nonmagnetic material having one end thereof attached to said pole piece means, said stop means being operable to limit the movement of said main valve member relative to said pole piece means, whereupon actuation of said magnetomotive force means, said armature means is moved from said first position to said second position permitting flow through said pilot passage thereby causing a pressure differential across said valve member, whereupon said main valve passage is opened by the forces of differential pressure acting thereacross, wherein as said main valve moves from said closed to said open position, said stop means, said pole piece means and said armature means move as a unit therewith.

* * * * *